(12) United States Patent
Zhan et al.

(10) Patent No.: US 11,699,960 B2
(45) Date of Patent: Jul. 11, 2023

(54) SWITCHED CAPACITOR CONVERTER AND METHOD THEREOF

(71) Applicant: NuVolta Technologies (Shanghai) Co., Ltd., Shanghai (CN)

(72) Inventors: Fuchun Zhan, Shanghai (CN); Cheng Liu, Shanghai (CN)

(73) Assignee: NuVolta Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/498,810

(22) Filed: Oct. 12, 2021

(65) Prior Publication Data

US 2023/0075326 A1 Mar. 9, 2023

(30) Foreign Application Priority Data

Sep. 7, 2021 (CN) .......................... 202111042407.7

(51) Int. Cl.
  *H02M 7/483* (2007.01)
  *H02M 1/00* (2006.01)
  *H02M 1/10* (2006.01)
  *H02M 3/07* (2006.01)

(52) U.S. Cl.
  CPC ......... *H02M 7/4835* (2021.05); *H02M 1/007* (2021.05); *H02M 1/10* (2013.01); *H02M 3/072* (2021.05); *H02M 3/073* (2013.01)

(58) Field of Classification Search
  CPC ...... H02M 1/0058; H02M 3/07; H02M 7/219; H02M 7/4835; H02M 1/007; H02M 3/158; H02M 3/01; Y02B 70/10
  See application file for complete search history.

(56) References Cited

U.S. PATENT DOCUMENTS

| | | | | |
|---|---|---|---|---|
| 5,877,948 A * | 3/1999 | Dijkmans | ............... | H02M 3/07 363/59 |
| 9,024,478 B2 * | 5/2015 | Cooley | ................... | H03K 3/57 307/82 |
| 9,054,576 B2 * | 6/2015 | Kang | ..................... | H02M 3/07 |
| 9,831,776 B1 * | 11/2017 | Jiang | ........................ | H02M 1/15 |
| 9,917,517 B1 * | 3/2018 | Jiang | ........................ | H02M 1/34 |
| 10,122,256 B1 * | 11/2018 | Babazadeh | ........... | H02M 1/083 |
| 10,211,733 B1 * | 2/2019 | Jiang | ........................ | H02M 1/15 |
| 10,587,189 B1 * | 3/2020 | Ausseresse | ............. | H02M 3/07 |
| 10,608,530 B1 * | 3/2020 | Zhu | ........................ | H02M 3/07 |
| 10,608,539 B1 * | 3/2020 | Huang | ..................... | H02J 1/102 |
| 10,651,731 B1 * | 5/2020 | Rainer | ................ | H02M 3/1588 |
| 10,680,512 B2 * | 6/2020 | Babazadeh | ............. | H02M 1/36 |
| 10,778,098 B2 * | 9/2020 | Yang | ........................ | H02M 3/07 |
| 10,879,808 B2 * | 12/2020 | Li | ........................ | H02M 3/01 |
| 10,972,010 B2 * | 4/2021 | Cheng | ..................... | H02M 3/07 |
| 11,043,898 B2 * | 6/2021 | Cheng | .................... | H02M 3/335 |
| 11,165,335 B2 * | 11/2021 | Sblano | ..................... | H02M 1/38 |
| 11,418,112 B2 * | 8/2022 | Liu | ..................... | H02M 1/0058 |

(Continued)

*Primary Examiner* — Yusef A Ahmed

(74) *Attorney, Agent, or Firm* — Li Li; AP3 Law Firm PLLC

(57) ABSTRACT

A power converter includes a plurality of switches coupled between an input bus and an output bus, a full bridge coupled between the output bus and ground, and a plurality of capacitors coupled between the plurality of switches and the full bridge, wherein one capacitor of the plurality of capacitors is connected to a midpoint of one leg of the full bridge through a switch.

18 Claims, 13 Drawing Sheets

(56) References Cited

U.S. PATENT DOCUMENTS

| | | | |
|---|---|---|---|
| 2012/0223583 A1* | 9/2012 | Cooley | H02J 3/381 327/109 |
| 2015/0077085 A1* | 3/2015 | Chen | G05F 3/08 323/299 |
| 2019/0028025 A1* | 1/2019 | Babazadeh | H02M 1/36 |
| 2020/0186039 A1* | 6/2020 | Cheng | H02M 1/083 |
| 2021/0288581 A1* | 9/2021 | Zhu | H02M 1/0048 |
| 2021/0336530 A1* | 10/2021 | Shen | H02M 3/1582 |
| 2022/0014086 A1* | 1/2022 | Ye | H02M 3/01 |
| 2022/0014109 A1* | 1/2022 | Ye | H02M 3/07 |
| 2022/0014110 A1* | 1/2022 | Ye | H02M 3/158 |

* cited by examiner

SWITCHED CAPACITOR CONVERTER AND METHOD THEREOF

PRIORITY CLAIM

This application claims priority to Chinese Patent Application No. 2021110424077, filed on Sep. 7, 2021, which is hereby incorporated by reference in its entirety.

TECHNICAL FIELD

The present invention relates to a switched capacitor converter and method, and, in particular embodiments, to a switched capacitor converter having a plurality of voltage conversion ratios.

BACKGROUND

As technologies further advance, a variety of electronic devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the batteries. A battery charger is controlled to provide voltage (e.g., a constant voltage charging mode) and current (e.g., a constant current charging mode) to a battery so as to restore energy to the battery.

As the power of the mobile devices goes higher, multi-cell batteries have been used in many mobile devices. Traditionally, the inductor-based buck-boost converters are widely used to charge the multi-cell batteries. The efficiency of the buck-boost converters is not high. As a result, the buck-boost converters have become the bottleneck to further increase the charging power. For achieving fast charging and high efficiency, switched capacitor converters are employed to charge multi-cell batteries. A conventional switched capacitor converter comprises a plurality of switches and a flying capacitor. The switched-capacitor converter can provide compact and efficient power for charging batteries.

The conventional switched capacitor converter can only have a fixed voltage conversion ratio (e.g., 2:1). As the power of the mobile devices goes higher, there may be a need for charging multi-cell batteries with a variable voltage conversion ratio. More particularly, achieving a variable voltage conversion ratio (e.g., 1:1, 2:1, 3:1 or 4:1) under various input and output conditions (e.g., different load currents and/or different rated input voltages of the power source) has become a significant issue, which presents challenges to the system design of the battery charging system. It would be desirable to have a power converter capable of achieving high efficiency under a variety of operating conditions.

SUMMARY

These and other problems are generally solved or circumvented, and technical advantages are generally achieved, by preferred embodiments of the present disclosure which provide a switched capacitor converter having a plurality of voltage conversion ratios.

In accordance with an embodiment, a power converter comprises a plurality of switches coupled between an input bus and an output bus, a full bridge coupled between the output bus and ground, and a plurality of capacitors coupled between the plurality of switches and the full bridge, wherein one capacitor of the plurality of capacitors is connected to a midpoint of one leg of the full bridge through a switch.

In accordance with another embodiment, a method comprises coupling a power converter to a multi-cell battery, wherein the power converter comprising a plurality of switches connected in series between an input bus coupled to a power source and an output bus coupled to the multi-cell battery, a full bridge coupled between the output bus and ground, and a plurality of capacitors coupled between the plurality of switches and the full bridge, wherein one capacitor of the plurality of capacitors is connected to a midpoint of one leg of the full bridge through a switch, and configuring the power converter as an N:1 converter in response to a plurality of operating conditions.

In accordance with yet another embodiment, a controller comprises a plurality of gate drivers configured to generate a plurality of gate drive signals for configuring a power converter as an N:1 converter, the power converter comprising a plurality of switches coupled between an input bus and an output bus, a full bridge coupled between the output bus and ground, and a plurality of capacitors coupled between the plurality of switches and the full bridge, wherein one capacitor of the plurality of capacitors is connected to a midpoint of one leg of the full bridge through a switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a switched capacitor converter having a plurality of voltage conversion ratios. The disclosure may also be applied, however, to a variety of power systems. Hereinafter, various embodiments will be explained in detail with reference to the accompanying drawings.

Figure 1:
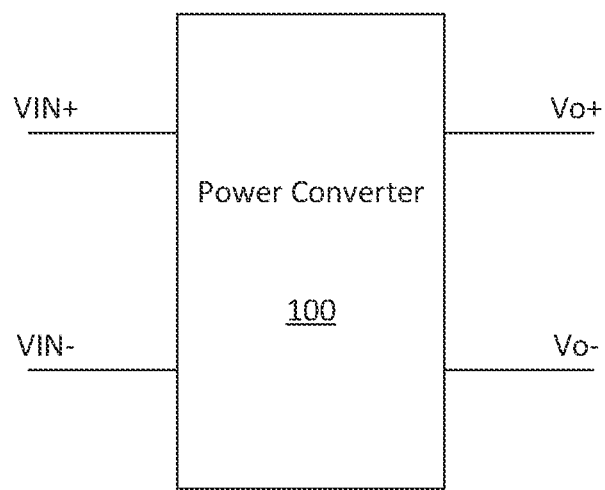
FIG. 1 illustrates a block diagram of a power converter in accordance with various embodiments of the present disclosure.

FIG. 1 illustrates a block diagram of a power converter in accordance with various embodiments of the present disclosure. The power converter 100 has four input/output terminals, namely VIN+, VIN−, Vo+ and Vo− as shown in FIG. 1. The inputs (VIN+ and VIN−) of the power converter 100 may be coupled to a power source such as an output of a USB adaptor, an output of a wireless charging system and the like. The outputs (Vo+ and Vo−) of the power converter 100 may be coupled to a battery such as a multi-cell battery. In some embodiments, VIN− and Vo− are connected together and further coupled to ground. Throughout the description, VIN+ may be alternatively referred to as an input bus. Vo+ may be alternatively referred to as an output bus.

In some embodiments, the power converter 100 comprises a plurality of switches, a full bridge, a plurality of capacitors and a switch. The plurality of switches is coupled between the input bus and the output bus. The full bridge is coupled between the output bus and ground. The plurality of capacitors is coupled between the plurality of switches and the full bridge. One capacitor of the plurality of capacitors is connected to a midpoint of one leg of the full bridge through the switch. The detailed structure of the power converter 100 will be described below with respect to FIG. 2.

Figure 2:
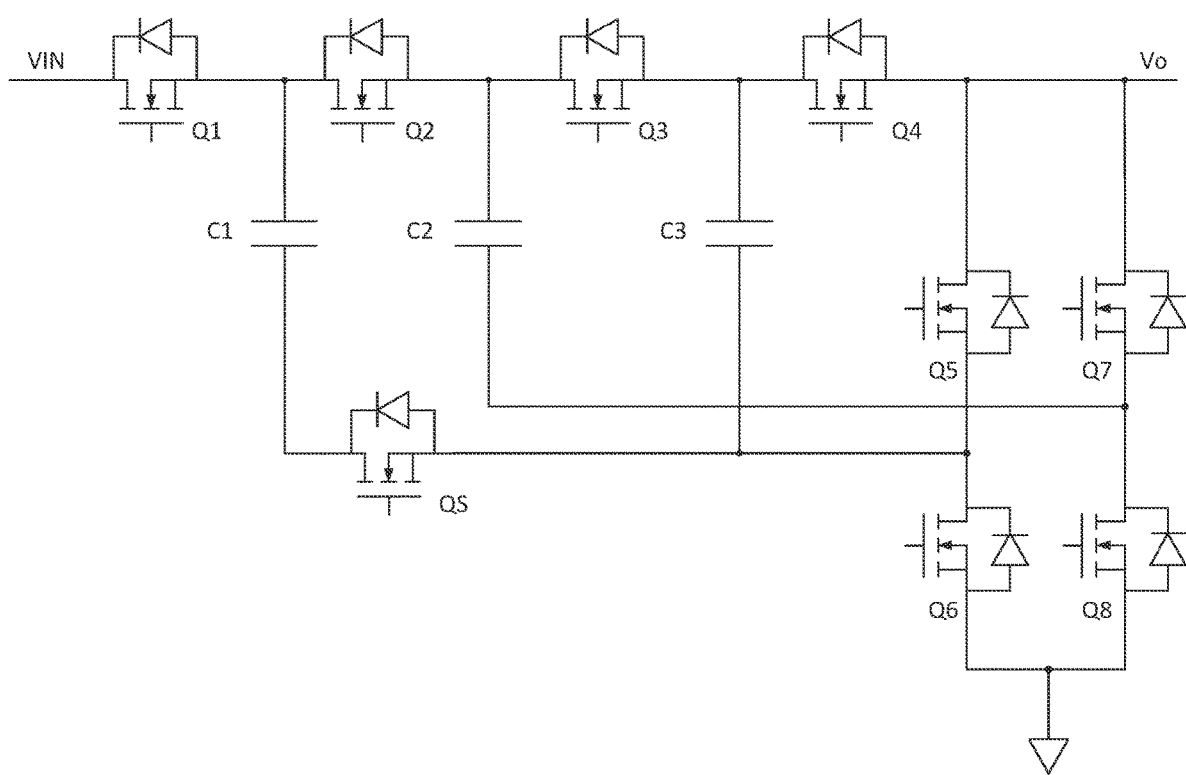
FIG. 2 illustrates a schematic diagram of the power converter shown in FIG. 1 in accordance with various embodiments of the present disclosure.

FIG. 2 illustrates a schematic diagram of the power converter shown in FIG. 1 in accordance with various embodiments of the present disclosure. The power converter is a switched capacitor converter. As shown in FIG. 2, the power converter comprises a first switch Q1, a second switch Q2, a third switch Q3 and a fourth switch Q4 coupled between the input bus VIN and the output bus Vo. The power converter further comprises a full bridge, three capacitors (C1, C2 and C3) and a switch QS.

The full bridge comprises a fifth switch Q5 and a sixth switch Q6 connected in series between the output bus Vo and ground. The full bridge further comprises a seventh switch Q7 and an eighth switch Q8 connected in series between the output bus Vo and ground. A common node of the fifth switch Q5 and the sixth switch Q6 is the midpoint of the one leg of the full bridge described above with respect to FIG. 1.

As shown in FIG. 2, a first capacitor C1 is connected between a common node of the first switch Q1 and the second switch Q2, and the common node of the fifth switch Q5 and the sixth switch Q6 through the switch QS. The first capacitor C1 is the one capacitor of the plurality of capacitors described above with respect to FIG. 1.

As shown in FIG. 2, a second capacitor C2 is connected between a common node of the second switch Q2 and the third switch Q3, and a common node of the seventh switch Q7 and the eighth switch Q8. A third capacitor C3 is connected between a common node of the third switch Q3 and the fourth switch Q4, and the common node of the fifth switch Q5 and the sixth switch Q6. As shown in FIG. 2, the switch QS is connected between the first capacitor C1 and the third capacitor C3.

A controller (not shown but illustrated in FIG. 12) is configured to generate gate drive signals for switches Q1-Q8 and QS. Furthermore, the controller is configured to control the operation of each switch based on a plurality of operating parameters and operating modes. Furthermore, the controller is configured to generate gate drive signals for configuring the power converter as an N:1 power converter. In some embodiments, N is an integer in a range from 1 to 4.

In accordance with an embodiment, the switches of FIG. 2 (e.g., switches Q1-Q8 and QS) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 2 shows the switches Q1-Q8 and QS are implemented as single n-type transistors, a person skilled in the art would recognize there may be many variations, modifications and alternatives. For example, depending on different applications and design needs, at least some of the switches Q1-Q8 may be implemented as p-type transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

In operation, depending on different operating conditions and design needs, in some embodiments, the power converter may be configured as a 1:1 power converter. The detailed operating principle of the 1:1 power converter will be discussed below with respect to FIGS. 3-4. In alternative embodiments, the power converter may be configured as a 2:1 power converter. The detailed operating principle of the 2:1 power converter will be discussed below with respect to FIGS. 5-6. Furthermore, the power converter may be configured as a 3:1 power converter. The detailed operating principle of the 3:1 power converter will be discussed below with respect to FIGS. 7-8. Moreover, the power converter may be configured as a 4:1 power converter. The detailed operating principle of the 4:1 power converter will be discussed below with respect to FIGS. 9-10.

One advantageous feature of the power converter shown in FIG. 2 is that only nine switches are employed to achieve the four different voltage conversion ratios described above. In a conventional switched capacitor power converter, for having the same number of voltage conversion ratios, at least ten switches are required. Reducing part counts (nine switches instead of ten switches) helps to improve reliability and reduce the system cost.

Figure 3:
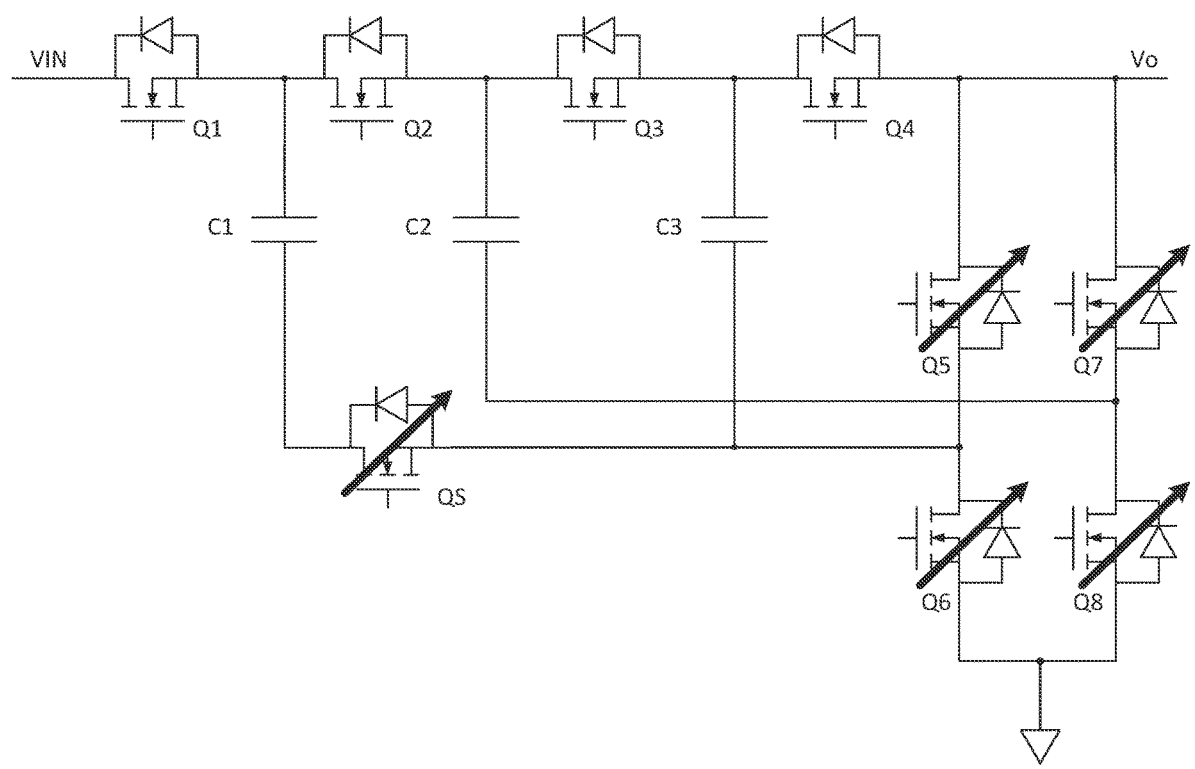
FIG. 3 illustrates the operating principle of the charge mode of the power converter after the power converter has been configured as a 1:1 power converter in accordance with various embodiments of the present disclosure.

FIG. 3 illustrates the operating principle of the charge mode of the power converter after the power converter has been configured as a 1:1 power converter in accordance with various embodiments of the present disclosure. In the charge mode of the 1:1 power converter, the first switch Q1, the second switch Q2, the third switch Q3 and the fourth switch Q4 are turned on. The fifth switch Q5, the sixth switch Q6, the seventh switch Q7, the eighth switch Q8 and the switch QS are turned off as indicated by the arrows on their symbols.

In the charge mode of the 1:1 power converter, the turned on Q1, Q2, Q3 and Q4 establish a conductive path from VIN to Vo. The voltage on the output bus Vo is equal to the voltage on the input bus VIN.

Figure 4:
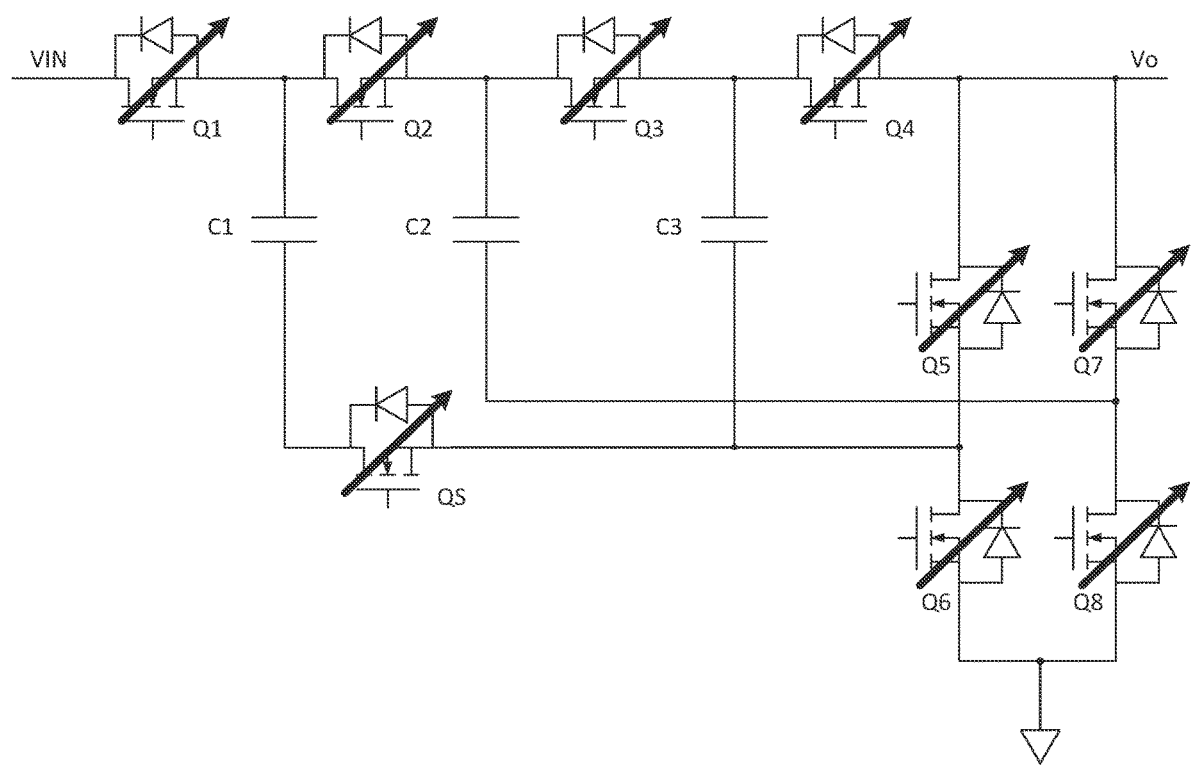
FIG. 4 illustrates the operating principle of the discharge mode of the power converter after the power converter has been configured as a 1:1 power converter in accordance with various embodiments of the present disclosure.

FIG. 4 illustrates the operating principle of the discharge mode of the power converter after the power converter has been configured as a 1:1 power converter in accordance with various embodiments of the present disclosure. In the discharge mode of the 1:1 power converter, the first switch Q1, the second switch Q2, the third switch Q3, the fourth switch Q4, the fifth switch Q5, the sixth switch Q6, the seventh switch Q7, the eighth switch Q8 and the switch QS are turned off as indicated by the arrows on their symbols.

In FIGS. 3-4, the output voltage of the power converter is equal to the input voltage of the power converter. The power converter functions as a 1:1 power converter.

Figure 5:
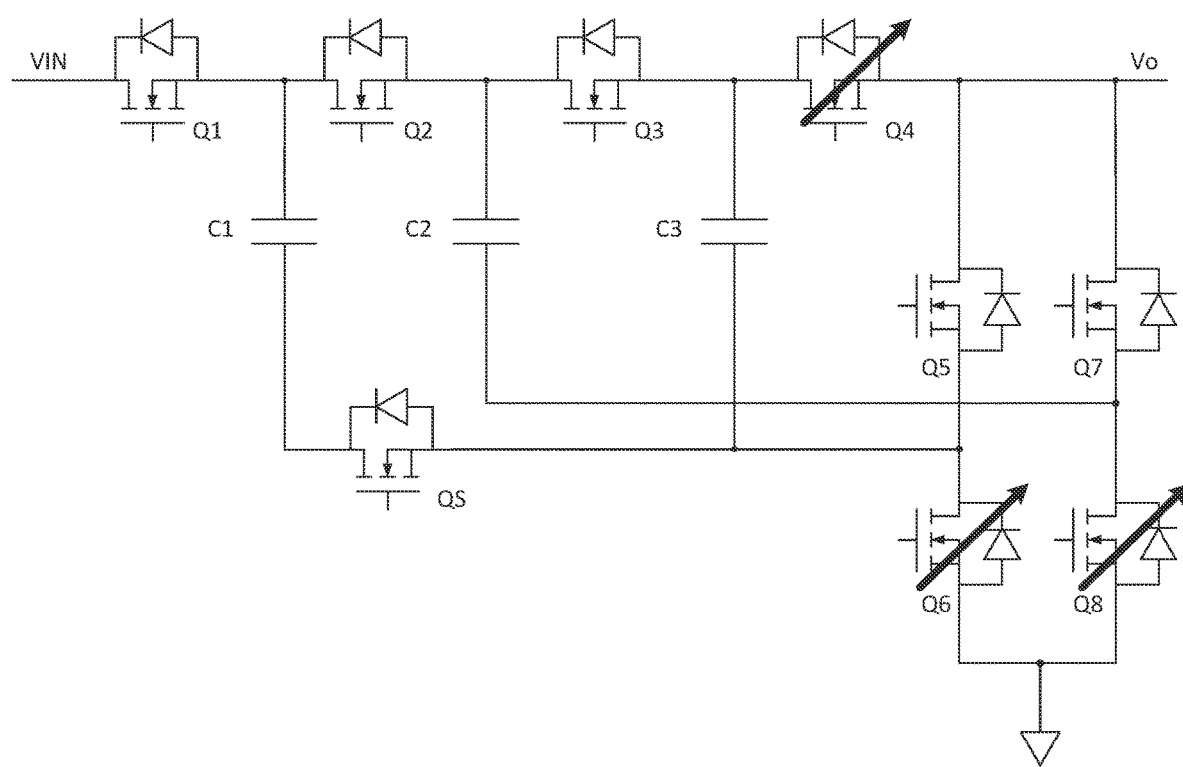
FIG. 5 illustrates the operating principle of the charge mode of the power converter after the power converter has been configured as a 2:1 power converter in accordance with various embodiments of the present disclosure.

FIG. 5 illustrates the operating principle of the charge mode of the power converter after the power converter has been configured as a 2:1 power converter in accordance with various embodiments of the present disclosure. In the charge mode of the 2:1 power converter, the first switch Q1, the second switch Q2, the third switch Q3, the fifth switch Q5, the seventh switch Q7 and the switch QS are turned on. The fourth switch Q4, the sixth switch Q6 and the eighth switch Q8 are turned off as indicated by the arrows on their symbols.

In the charge mode of the 2:1 power converter, the capacitors C1, C2 and C3 are connected in parallel between VIN and VO after the first switch Q1, the second switch Q2, the third switch Q3, the fifth switch Q5, the seventh switch Q7 and the switch QS have been turned on. The voltage across the capacitors C1, C2 and C3 is equal to one half of the input voltage on the input bus VIN. As a result, the voltage on the output bus Vo is equal to one half of the input voltage on the input bus VIN.

Figure 6:
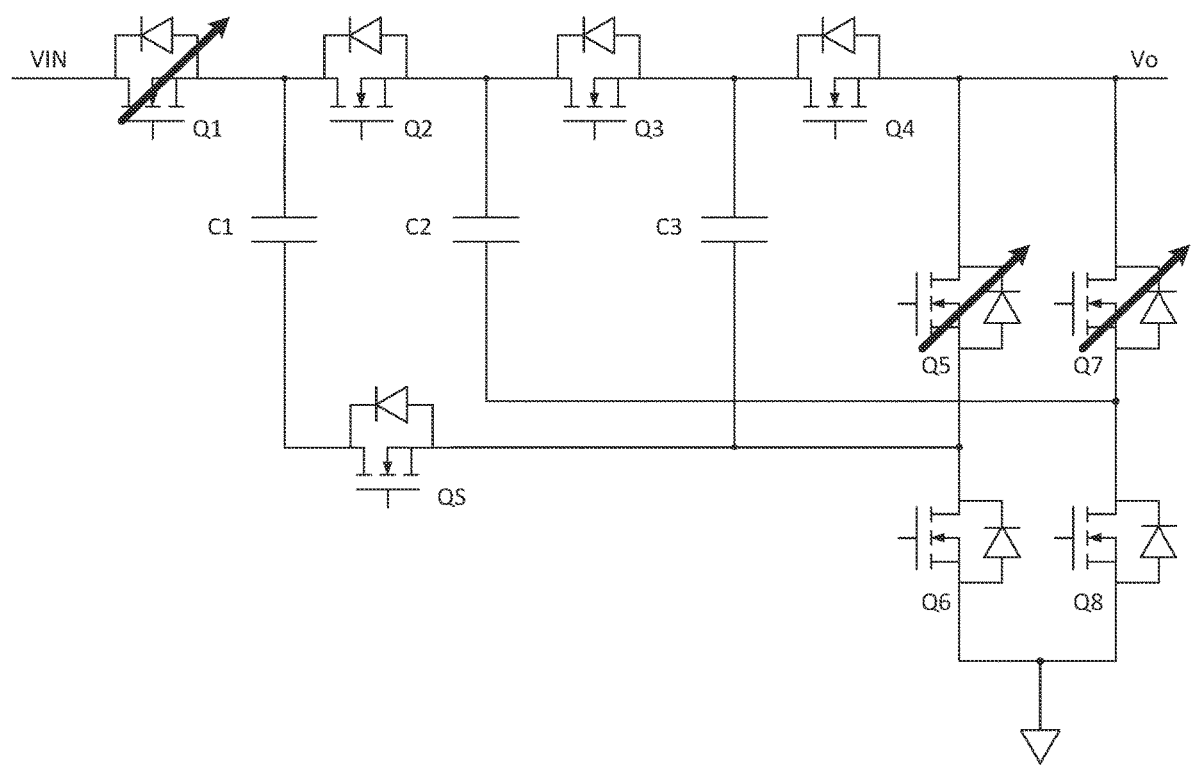
FIG. 6 illustrates the operating principle of the discharge mode of the power converter after the power converter has been configured as a 2:1 power converter in accordance with various embodiments of the present disclosure.

FIG. 6 illustrates the operating principle of the discharge mode of the power converter after the power converter has been configured as a 2:1 power converter in accordance with various embodiments of the present disclosure. In the discharge mode of the 2:1 power converter, the second switch Q2, the third switch Q3, the fourth switch Q4, the sixth switch Q6, the eighth switch Q8 and the switch QS are turned on. The first switch Q1, the fifth switch Q5 and the seventh switch Q7 are turned off as indicated by the arrows on their symbols.

In the discharge mode of the 2:1 power converter, the capacitors C1, C2 and C3 are connected in parallel between VO and ground after the second switch Q2, the third switch Q3, the fourth switch Q4, the sixth switch Q6, the eighth switch Q8 and the switch QS have been turned on. The voltage across the capacitors C1, C2 and C3 is equal to one half of the input voltage on the input bus VIN. As a result, the voltage on the output bus Vo is equal to one half of the input voltage on the input bus VIN.

In FIGS. 5-6, the output voltage of the power converter is equal to one half of the input voltage of the power converter. The power converter functions as a 2:1 power converter.

Figure 7:
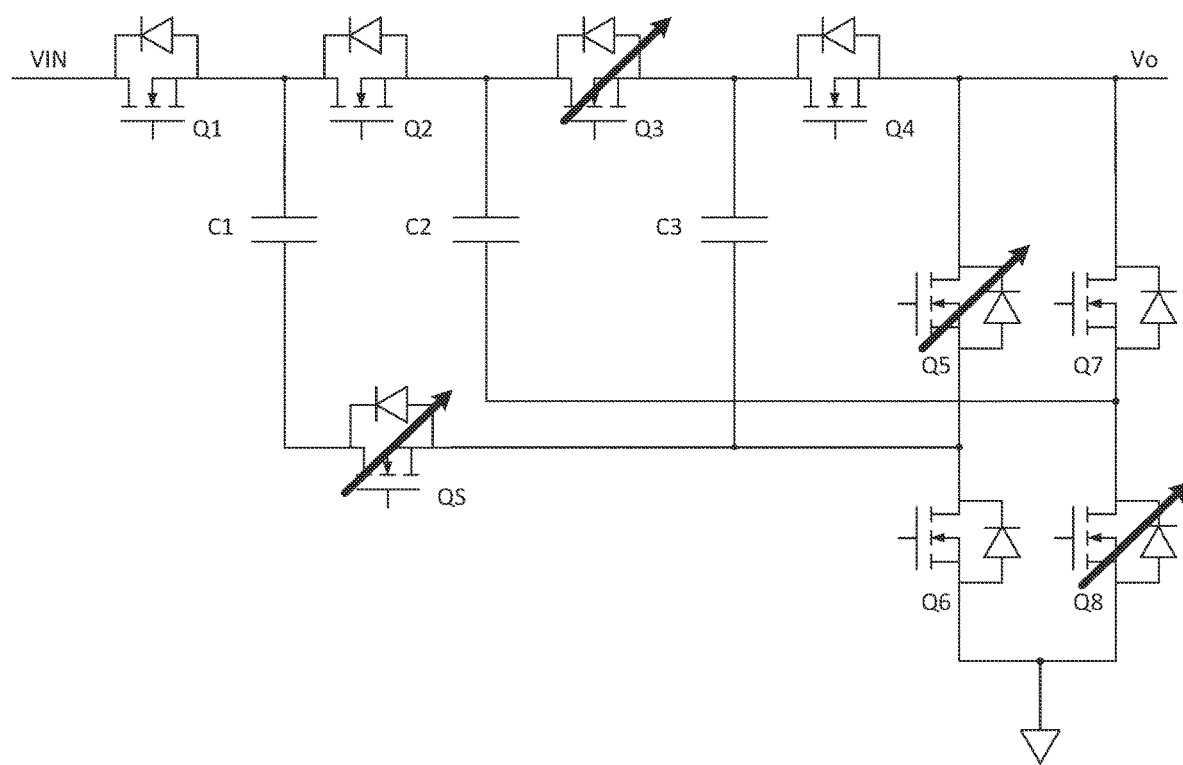
FIG. 7 illustrates the operating principle of the charge mode of the power converter after the power converter has been configured as a 3:1 power converter in accordance with various embodiments of the present disclosure.

FIG. 7 illustrates the operating principle of the charge mode of the power converter after the power converter has been configured as a 3:1 power converter in accordance with various embodiments of the present disclosure. In the charge mode of the 3:1 power converter, the first switch Q1, the second switch Q2, the fourth switch Q4, the sixth switch Q6 and the seventh switch Q7 are turned on. The third switch Q3, the fifth switch Q5, the eighth switch Q8 and the switch Q8 are turned off as indicated by the arrows on their symbols.

In the charge mode of the 3:1 power converter, the capacitors C2 and C3 are connected in series between VIN and ground after the first switch Q1, the second switch Q2, the fourth switch Q4, the sixth switch Q6 and the seventh switch Q7 have been turned on. Vo is connected to a common node of C2 and C3. The voltage across the capacitor C3 is equal to one third ($\frac{1}{3}$) of the input voltage on the input bus VIN. The voltage across the capacitor C2 is equal to two thirds ($\frac{2}{3}$) of the input voltage on the input bus VIN. As a result, the voltage on the output bus Vo is equal to one third ($\frac{1}{3}$) of the input voltage on the input bus VIN.

Figure 8:
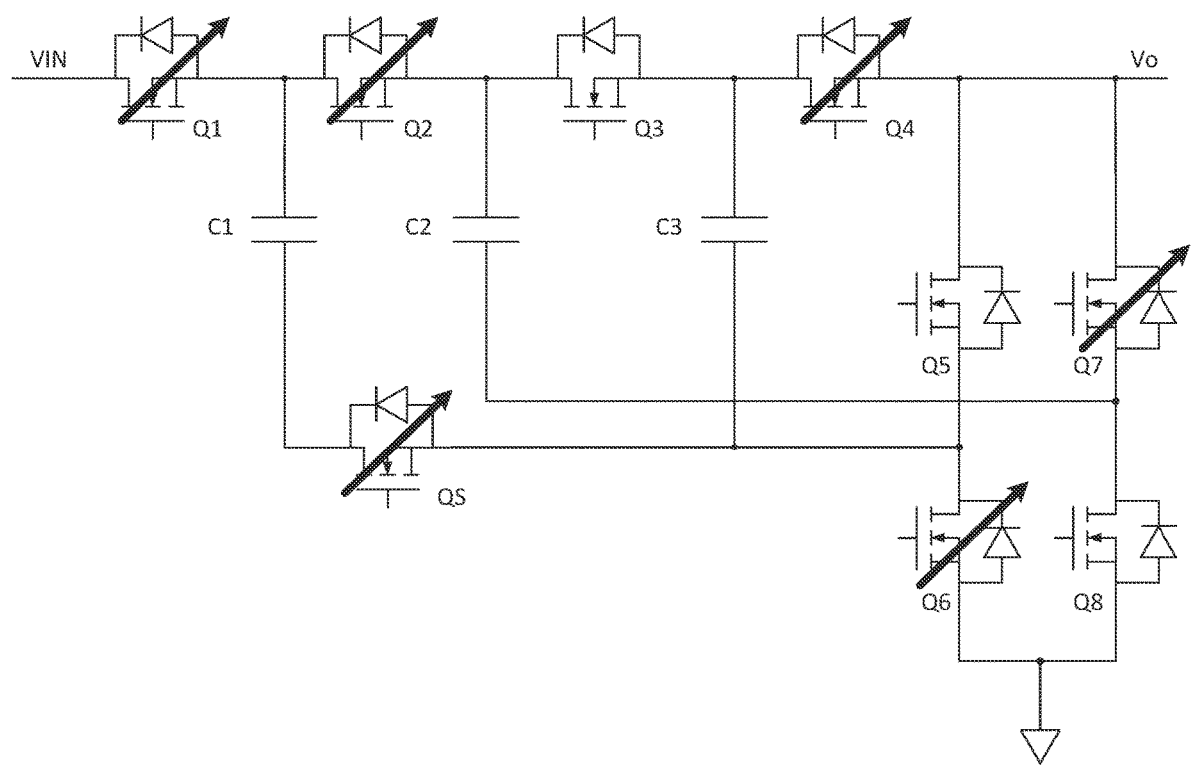
FIG. 8 illustrates the operating principle of the discharge mode of the power converter after the power converter has been configured as a 3:1 power converter in accordance with various embodiments of the present disclosure.

FIG. 8 illustrates the operating principle of the discharge mode of the power converter after the power converter has been configured as a 3:1 power converter in accordance with various embodiments of the present disclosure. In the discharge mode of the 3:1 power converter, the third switch Q3, the fifth switch Q5 and the eighth switch Q8 are turned on. The first switch Q1, the second switch Q2, the fourth switch Q4, the sixth switch Q6, the seventh switch Q7 and the switch QS are turned off as indicated by the arrows on their symbols.

In the discharge mode of the 3:1 power converter, the capacitors C3 and C2 are connected in series between Vo and ground after the third switch Q3, the fifth switch Q5 and the eighth switch Q8 have been turned on. The voltage across the capacitor C3 is equal to one third ($\frac{1}{3}$) of the input voltage on the input bus VIN. The voltage across the capacitor C2 is equal to two thirds ($\frac{2}{3}$) of the input voltage on the input bus VIN. The voltage on the output bus Vo is equal to the voltage the capacitor C2 minus the voltage across the capacitor C3. As a result, the voltage on the output bus Vo is equal to one third (⅓) of the input voltage on the input bus VIN.

In FIGS. 7-8, the output voltage of the power converter is equal to one third (⅓) of the input voltage of the power converter. The power converter functions as a 3:1 power converter.

Figure 9:
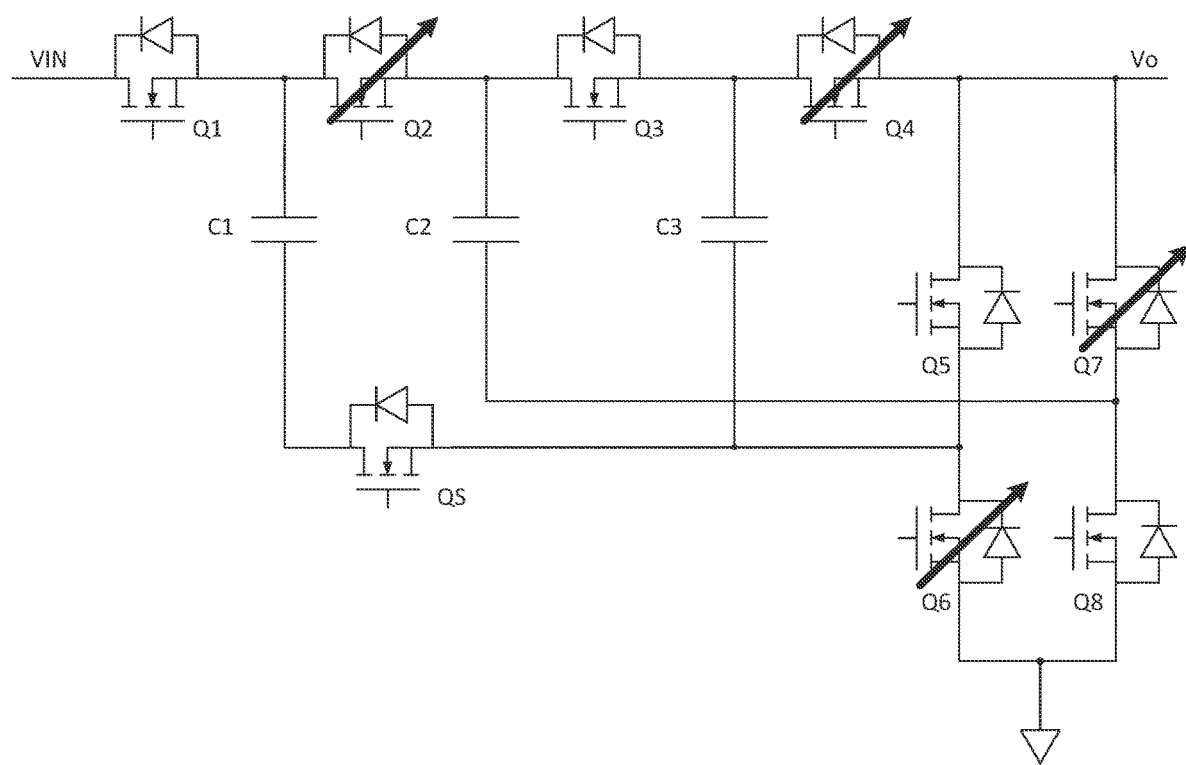
FIG. 9 illustrates the operating principle of the charge mode of the power converter after the power converter has been configured as a 4:1 power converter in accordance with various embodiments of the present disclosure.

FIG. 9 illustrates the operating principle of the charge mode of the power converter after the power converter has been configured as a 4:1 power converter in accordance with various embodiments of the present disclosure. In the charge mode of the 4:1 power converter, the first switch Q1, the third switch Q3, the fifth switch Q5, the eighth switch Q8 and the switch QS are turned on. The second switch Q2, the fourth switch Q4, the sixth switch Q6 and the seventh switch Q7 are turned off as indicated by the arrows on their symbols.

In the charge mode of the 4:1 power converter, the capacitor C1 is connected between VIN and Vo, and the capacitors C3 and C2 are connected in series between Vo and ground after the first switch Q1, the third switch Q3, the fifth switch Q5, the eighth switch Q8 and the switch QS have been turned on. The voltage across the capacitor C1 is equal to three fourths (¾) of the input voltage on the input bus VIN. The voltage across the capacitor C2 is equal to one half of the input voltage on the input bus VIN. The voltage across the capacitor C3 is equal to one fourth (¼) of the input voltage on the input bus VIN. As a result, the voltage on the output bus Vo is equal to one fourth (¼) of the input voltage on the input bus VIN.

Figure 10:
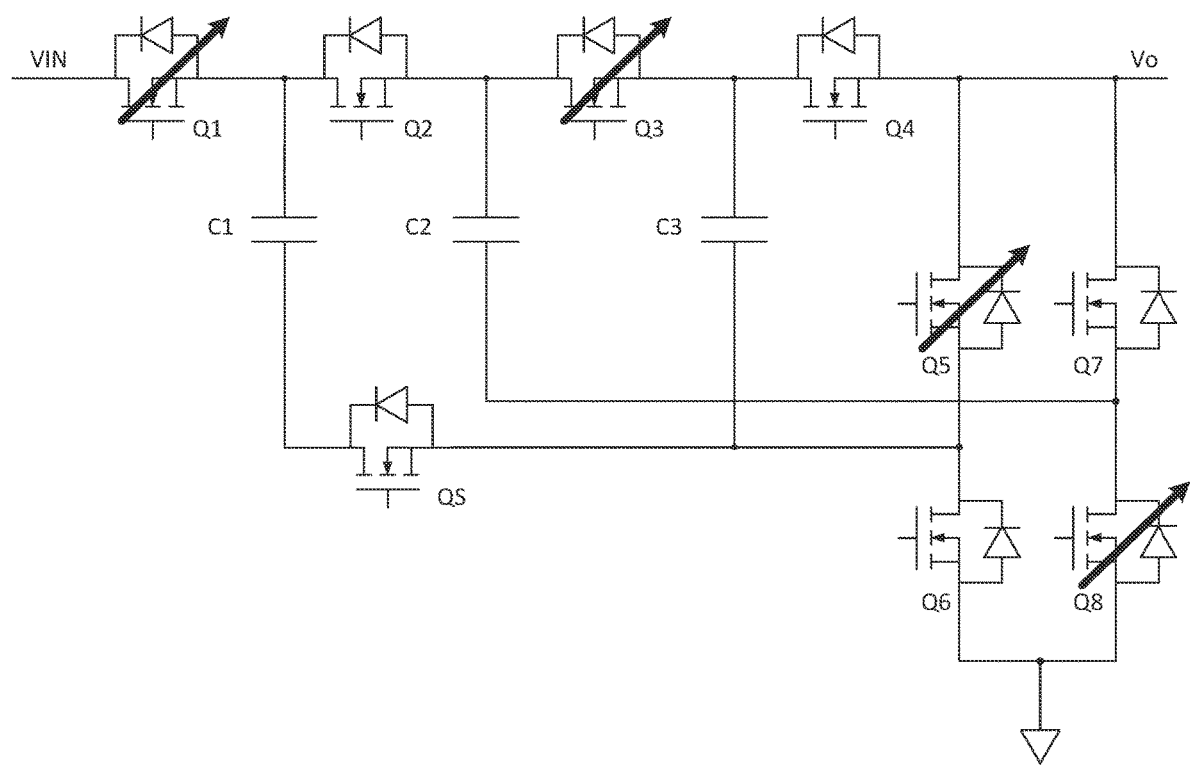
FIG. 10 illustrates the operating principle of the discharge mode of the power converter after the power converter has been configured as a 4:1 power converter in accordance with various embodiments of the present disclosure.

FIG. 10 illustrates the operating principle of the discharge mode of the power converter after the power converter has been configured as a 4:1 power converter in accordance with various embodiments of the present disclosure. In the discharge mode of the 4:1 power converter, the second switch Q2, the fourth switch Q4, the sixth switch Q6, the seventh switch Q7 and the switch QS are turned on. The first switch Q1, the third switch Q3, the fifth switch Q5 and the eighth switch Q8 are turned off as indicated by the arrows on their symbols.

In the discharge mode of the 4:1 power converter, the capacitor C3 is connected between Vo and ground, and the capacitors C2 and C1 are connected in series between Vo and ground after the second switch Q2, the fourth switch Q4, the sixth switch Q6, the seventh switch Q7 and the switch QS have been turned on. The voltage across the capacitor C1 is equal to three fourths (¾) of the input voltage on the input bus VIN. The voltage across the capacitor C2 is equal to one half of the input voltage on the input bus VIN. The voltage across the capacitor C3 is equal to one fourth (¼) of the input voltage on the input bus VIN. As a result, the voltage on the output bus Vo is equal to one fourth (¼) of the input voltage on the input bus VIN.

In FIGS. 9-10, the output voltage of the power converter is equal to one fourth (¼) of the input voltage of the power converter. The power converter functions as a 4:1 power converter.

Figure 11:
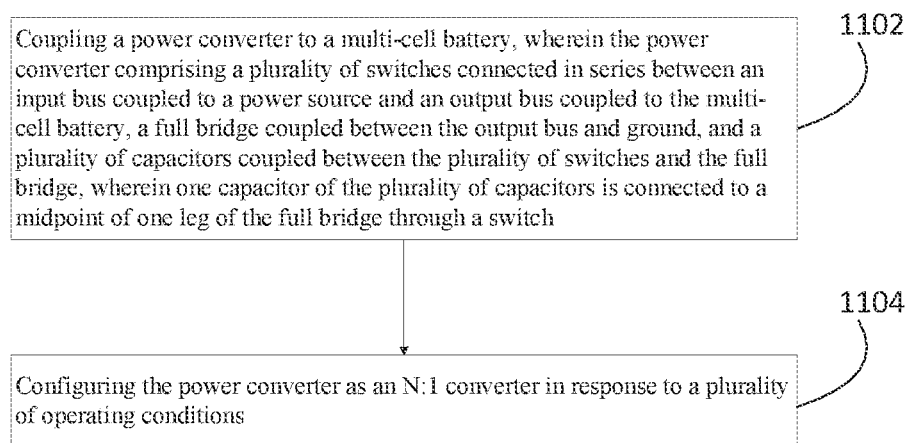
FIG. 11 illustrates a flow chart of controlling the power converter shown in FIG. 1 in accordance with various embodiments of the present disclosure.

FIG. 11 illustrates a flow chart of controlling the power converter shown in FIG. 1 in accordance with various embodiments of the present disclosure. This flowchart shown in FIG. 11 is merely an example, which should not unduly limit the scope of the claims. One of ordinary skill in the art would recognize many variations, alternatives, and modifications. For example, various steps illustrated in FIG. 11 may be added, removed, replaced, rearranged and repeated.

Referring back to FIG. 2, the power converter is a switched capacitor converter. The switched capacitor converter comprises a first switch, a second switch, a third switch, a fourth switch coupled between the input bus and the output bus, a full bridge comprising a fifth switch, a sixth switch connected in series between the output bus and ground, and a seventh switch, an eighth switch connected in series between the output bus and ground.

The power converter further comprises a first capacitor connected between a common node of the first switch and the second switch, and the common node of the fifth switch and the sixth switch through a switch, a second capacitor connected between a common node of the second switch and the third switch, and a common node of the seventh switch and the eighth switch, and a third capacitor connected between a common node of the third switch and the fourth switch, and the common node of the fifth switch and the sixth switch.

At step 1102, the power converter is coupled to a multi-cell battery. The power converter is configured to charge the multi-cell battery. The power converter comprises a plurality of switches connected in series between an input bus coupled to a power source and an output bus coupled to the multi-cell battery, a full bridge coupled between the output bus and ground, and a plurality of capacitors coupled between the plurality of switches and the full bridge. One capacitor of the plurality of capacitors is connected to a midpoint of one leg of the full bridge through a switch.

At step 1104, the power converter is configured as an N:1 converter in response to a plurality of operating conditions.

Referring back to FIGS. 3-4, the method further comprising configuring the power converter as a 1:1 power converter, in a charge mode of the 1:1 power converter, turning on the first switch, the second switch, the third switch and the fourth switch, and turning off the fifth switch, the sixth switch, the seventh switch, the eighth switch and the switch, and in a discharge mode of the 1:1 power converter, turning off the first switch, the second switch, the third switch, the fourth switch, the fifth switch, the sixth switch, the seventh switch, the eighth switch and the switch.

Referring back to FIGS. 5-6, the method further comprising configuring the power converter as a 2:1 power converter, in a charge mode of the 2:1 power converter, turning on the first switch, the second switch, the third switch, the fifth switch, the seventh switch and the switch, and turning off the fourth switch, the sixth switch and the eighth switch, and in a discharge mode of the 2:1 power converter, turning on the second switch, the third switch, the fourth switch, the sixth switch, the eighth switch and the switch, and turning off the first switch, the fifth switch and the seventh switch.

Referring back to FIGS. 7-8, the method further comprising configuring the power converter as a 3:1 power converter, in a charge mode of the 3:1 power converter, turning on the first switch, the second switch, the fourth switch, the sixth switch and the seventh switch, and turning off the third switch, the fifth switch, the eighth switch and the switch, and in a discharge mode of the 3:1 power converter, turning on the third switch, the fifth switch and the eighth switch, and turning off the first switch, the second switch, the fourth switch, the sixth switch, the seventh switch and the switch.

Referring back to FIGS. 9-10, the method further comprising configuring the power converter as a 4:1 power converter, in a charge mode of the 4:1 power converter, turning on the first switch, the third switch, the fifth switch, the eighth switch and the switch, and turning off the second switch, the fourth switch, the sixth switch and the seventh switch, and in a discharge mode of the 4:1 power converter, turning on the second switch, the fourth switch, the sixth switch, the seventh switch and the switch, and turning off the first switch, the third switch, the fifth switch and the eighth switch.

Figure 12:
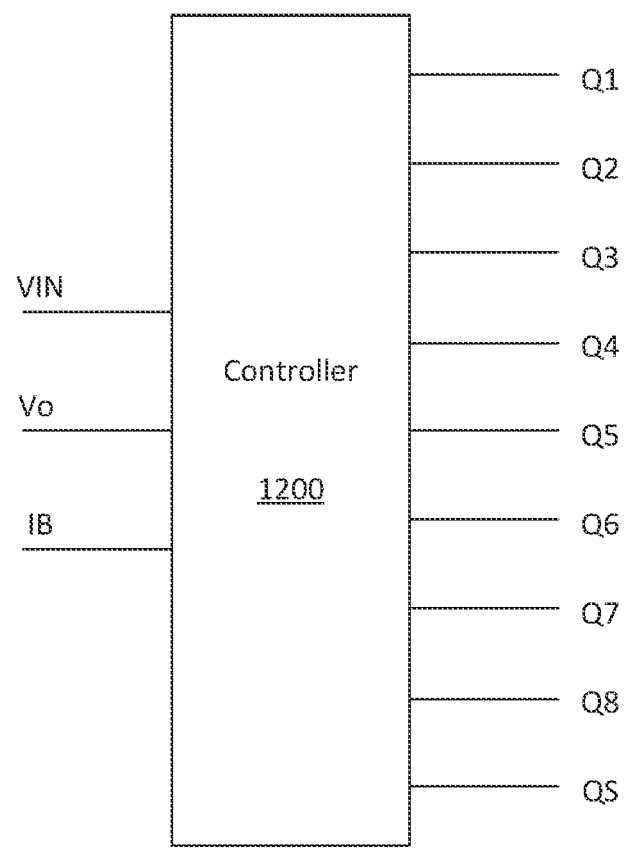
FIG. 12 illustrates a controller for driving the switches of the power converter shown in FIG. 1 in accordance with various embodiments of the present disclosure.

FIG. 12 illustrates a controller for driving the switches of the power converter shown in FIG. 1 in accordance with various embodiments of the present disclosure. The controller 1200 comprises nine gate drivers and a plurality of signal processing devices for processing various operating parameters such as a voltage on the input bus (VIN), a voltage on the output bus (Vo) and a load current (TB).

A first gate driver is configured to generate a first gate drive signal applied to the gate of Q1. A second gate driver is configured to generate a second gate drive signal applied to the gate of Q2. A third gate driver is configured to generate a third gate drive signal applied to the gate of Q3. A fourth gate driver is configured to generate a fourth gate drive signal applied to the gate of Q4. A fifth gate driver is configured to generate a fifth gate drive signal applied to the gate of Q5. A sixth gate driver is configured to generate a sixth gate drive signal applied to the gate of Q6. A seventh gate driver is configured to generate a seventh gate drive signal applied to the gate of Q7. An eighth gate driver is configured to generate an eighth gate drive signal applied to the gate of Q8. A ninth gate driver is configured to generate a ninth gate drive signal applied to the gate of QS.

It should be noted that the controller 1200 having nine gate drivers described above is merely an example, which should not unduly limit the scope of the claims. One of ordinary skill in the art would recognize many variations, alternatives, and modifications. For example, external gate drivers may be used to further improve the drive capability.

In operation, the plurality of gate drivers is configured to generate a plurality of gate drive signals. The plurality of gate drive signals is configured such that the power converter is configured as a 1:1 power converter. Referring back to FIGS. 3-4, in a charge mode of the 1:1 power converter, the first switch, the second switch, the third switch and the fourth switch are turned on, and the fifth switch, the sixth switch, the seventh switch, the eighth switch and the switch are turned off. In a discharge mode of the 1:1 power converter, the first switch, the second switch, the third switch, the fourth switch, the fifth switch, the sixth switch, the seventh switch, the eighth switch and the switch are turned off.

In operation, the plurality of gate drivers is configured to generate a plurality of gate drive signals. The plurality of gate drive signals is configured such that the power converter is configured as a 2:1 power converter. Referring back to FIGS. 5-6, in a charge mode of the 2:1 power converter, the first switch, the second switch, the third switch, the fifth switch, the seventh switch and the switch are turned on, and the fourth switch, the sixth switch and the eighth switch are turned off. In a discharge mode of the 2:1 power converter, the second switch, the third switch, the fourth switch, the sixth switch and the eighth switch and the switch are turned on, and the first switch, the fifth switch and the seventh switch are turned off.

In operation, the plurality of gate drivers is configured to generate a plurality of gate drive signals. The plurality of gate drive signals is configured such that the power converter is configured as a 3:1 power converter. Referring back to FIGS. 7-8, in a charge mode of the 3:1 power converter, the first switch, the second switch, the fourth switch, the sixth switch and the seventh switch are turned on, and the third switch, the fifth switch, the eighth switch and the switch are turned off. In a discharge mode of the 3:1 power converter, the third switch, the fifth switch and the eighth switch are turned on, and the first switch, the second switch, the fourth switch, the sixth switch, the seventh switch and the switch are turned off.

In operation, the plurality of gate drivers is configured to generate a plurality of gate drive signals. The plurality of gate drive signals is configured such that the power converter is configured as a 4:1 power converter. Referring back to FIGS. 9-10, in a charge mode of the 4:1 power converter, the first switch, the third switch, the fifth switch, the eighth switch and the switch are turned on, and the second switch, the fourth switch, the sixth switch and the seventh switch are turned off. In a discharge mode of the 4:1 power converter, the second switch, the fourth switch, the sixth switch, the seventh switch and the switch are turned on, and the first switch, the third switch, the fifth switch and the eighth switch are turned off.

Figure 13:
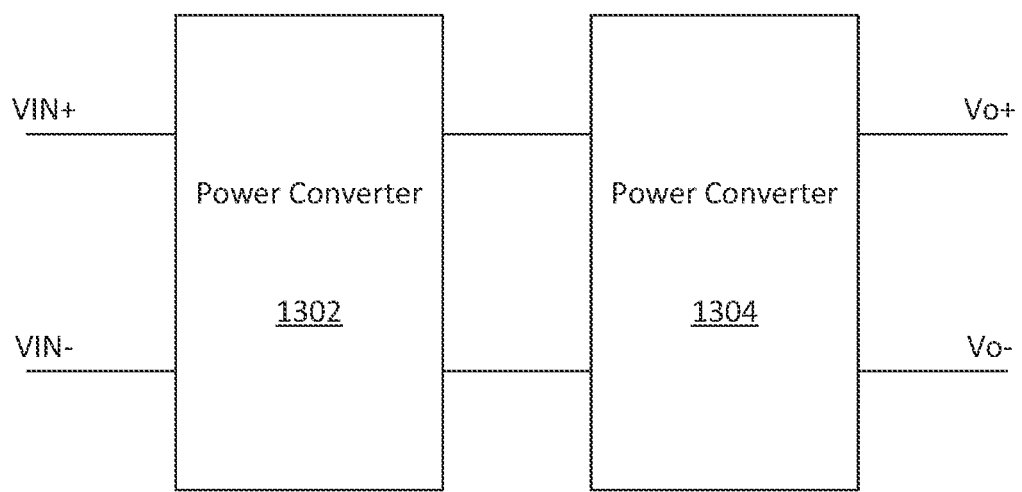
FIG. 13 illustrates a power system comprising a plurality of power converters in accordance with various embodiments of the present disclosure.

FIG. 13 illustrates a power system comprising a plurality of power converters in accordance with various embodiments of the present disclosure. The power system comprises a first power converter 1302 and a second power converter 1304 connected in cascade between the input buses (VIN+ and VIN−) and the output buses (Vo+ and Vo−). Each of these two power converters has a structure similar to that shown in FIG. 2. Each of these two power converters is capable of providing a variable voltage conversion ratio (e.g., 1:1, 2:1, 3:1 or 4:1). The voltage conversion ratio of the power system shown in FIG. 13 is equal to the product of the voltage conversion ratio of the first power converter 1302 and the voltage conversion ratio of the second power converter 1304. For example, the voltage conversion ratio of the first power converter 1302 is 2:1. The voltage conversion ratio of the second power converter 1304 is 3:1. The voltage conversion ratio of the power system shown in FIG. 13 is 6:1.

It should be recognized that while FIG. 13 illustrates the power system with two power converters 1302 and 1304, the power system shown in FIG. 13 could accommodate any number of power converters.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A power converter comprising:
a plurality of switches coupled between an input bus and an output bus;
a full bridge coupled between the output bus and a ground; and a plurality of capacitors coupled between the plurality of switches and the full bridge, wherein one capacitor of the plurality of capacitors is connected to a midpoint of one leg of the full bridge through a switch, wherein a drain of the switch is connected to the one capacitor, and a source of the switch is directly connected to the midpoint of the one leg of the full bridge, wherein:

a first switch, a second switch, a third switch and a fourth switch of the plurality of switches are coupled between the input bus and the output bus;

the full bridge comprises a fifth switch and a sixth switch connected in series between the output bus and the ground, and a seventh switch and an eighth switch connected in series between the output bus and the ground, and wherein a common node of the fifth switch and the sixth switch is the midpoint of the one leg of the full bridge;

a first capacitor of the plurality of capacitors is connected between a common node of the first switch and the second switch, and the common node of the fifth switch and the sixth switch through the switch, and wherein the first capacitor of the plurality of capacitors is the one capacitor of the plurality of capacitors;

a second capacitor of the plurality of capacitors is connected between a common node of the second switch and the third switch, and a common node of the seventh switch and the eighth switch; and a third capacitor of the plurality of capacitors is connected between a common node of the third switch and the fourth switch, and the common node of the fifth switch and the sixth switch, and wherein the switch has the drain directly connected to the first capacitor of the plurality of capacitors and the source directly connected to the third capacitor of the plurality of capacitors, and wherein the switch is configured such that the power converter is configured to operate in different modes including a 1:1 power conversion operating mode, a 2:1 power conversion operating mode, a 3:1 power conversion operating mode and a 4:1 power conversion operating mode.

2. The power converter of claim 1, wherein:
the power converter is configured as a 1:1 power converter, and wherein:
in a charge mode of the 1:1 power converter, the first switch, the second switch, the third switch and the fourth switch are turned on, and the fifth switch, the sixth switch, the seventh switch, the eighth switch and the switch are turned off; and
in a discharge mode of the 1:1 power converter, the first switch, the second switch, the third switch, the fourth switch, the fifth switch, the sixth switch, the seventh switch, the eighth switch and the switch are turned off.

3. The power converter of claim 1, wherein:
the power converter is configured as a 2:1 power converter, and wherein:
in a charge mode of the 2:1 power converter, the first switch, the second switch, the third switch, the fifth switch, the seventh switch and the switch are turned on, and the fourth switch, the sixth switch and the eighth switch are turned off; and
in a discharge mode of the 2:1 power converter, the second switch, the third switch, the fourth switch, the sixth switch, the eighth switch and the switch are turned on, and the first switch, the fifth switch and the seventh switch are turned off.

4. The power converter of claim 1, wherein:
the power converter is configured as a 3:1 power converter, and wherein:
in a charge mode of the 3:1 power converter, the first switch, the second switch, the fourth switch, the sixth switch and the seventh switch are turned on, and the third switch, the fifth switch, the eighth switch and the switch are turned off; and
in a discharge mode of the 3:1 power converter, the third switch, the fifth switch and the eighth switch are turned on, and the first switch, the second switch, the fourth switch, the sixth switch, the seventh switch and the switch are turned off.

5. The power converter of claim 1, wherein:
the power converter is configured as a 4:1 power converter, and wherein:
in a charge mode of the 4:1 power converter, the first switch, the third switch, the fifth switch, the eighth switch and the switch are turned on, and the second switch, the fourth switch, the sixth switch and the seventh switch are turned off; and
in a discharge mode of the 4:1 power converter, the second switch, the fourth switch, the sixth switch, the seventh switch and the switch are turned on, and the first switch, the third switch, the fifth switch and the eighth switch are turned off.

6. The power converter of claim 1, wherein:
the output bus is configured to be coupled to a multi-cell battery.

7. A method comprising:
coupling a power converter to a multi-cell battery, wherein the power converter comprising:
a plurality of switches connected in series between an input bus coupled to a power source and an output bus coupled to the multi-cell battery, wherein a first switch, a second switch, a third switch and a fourth switch of the plurality of switches are coupled between the input bus and the output bus;
a full bridge coupled between the output bus and a ground, the full bridge comprising a fifth switch and a sixth switch connected in series between the output bus and the ground, and a seventh switch and an eighth switch connected in series between the output bus and the ground; and
a plurality of capacitors coupled between the plurality of switches and the full bridge, wherein:
a first capacitor of the plurality of capacitors is connected between a common node of the first switch and the second switch, and a common node of the fifth switch and the sixth switch through a switch, and wherein a drain of the switch is directly connected to the first capacitor, and a source of the switch is directly connected to the common node of the fifth switch and the sixth switch;
a second capacitor of the plurality of capacitors is connected between a common node of the second switch and the third switch, and a common node of the seventh switch and the eighth switch; and
a third capacitor of the plurality of capacitors is connected between a common node of the third switch and the fourth switch, and the common node of the fifth switch and the sixth switch, and wherein the source of the switch is directly connected to the third capacitor; and
configuring the power converter as an N:1 converter in response to a plurality of operating conditions, wherein N is an integer, and wherein the switch is configured such that the power converter is configured to operate in different modes including a 1:1 power conversion operating mode, a 2:1 power conversion operating mode, a 3:1 power conversion operating mode and a 4:1 power conversion operating mode.

8. The method of claim 7, wherein the power converter is a switched capacitor converter.

9. The method of claim 8, further comprising:
configuring the power converter as a 1:1 power converter;
in a charge mode of the 1:1 power converter, turning on the first switch, the second switch, the third switch and the fourth switch, and turning off the fifth switch, the sixth switch, the seventh switch, the eighth switch and the switch; and
in a discharge mode of the 1:1 power converter, turning off the first switch, the second switch, the third switch, the fourth switch, the fifth switch, the sixth switch, the seventh switch, the eighth switch and the switch.

10. The method of claim 8, further comprising:
configuring the power converter as a 2:1 power converter;
in a charge mode of the 2:1 power converter, turning on the first switch, the second switch, the third switch, the fifth switch, the seventh switch and the switch, and turning off the fourth switch, the sixth switch and the eighth switch; and
in a discharge mode of the 2:1 power converter, turning on the second switch, the third switch, the fourth switch, the sixth switch, the eighth switch and the switch, and turning off the first switch, the fifth switch and the seventh switch.

11. The method of claim 8, further comprising:
configuring the power converter as a 3:1 power converter;
in a charge mode of the 3:1 power converter, turning on the first switch, the second switch, the fourth switch, the sixth switch and the seventh switch, and turning off the third switch, the fifth switch, the eighth switch and the switch; and
in a discharge mode of the 3:1 power converter, turning on the third switch, the fifth switch and the eighth switch, and turning off the first switch, the second switch, the fourth switch, the sixth switch, the seventh switch and the switch.

12. The method of claim 8, further comprising:
configuring the power converter as a 4:1 power converter;
in a charge mode of the 4:1 power converter, turning on the first switch, the third switch, the fifth switch, the eighth switch and the switch, and turning off the second switch, the fourth switch, the sixth switch and the seventh switch; and
in a discharge mode of the 4:1 power converter, turning on the second switch, the fourth switch, the sixth switch, the seventh switch and the switch, and turning off the first switch, the third switch, the fifth switch and the eighth switch.

13. A controller comprising:
a plurality of gate drivers configured to generate a plurality of gate drive signals for configuring a power converter as an N:1 converter, wherein N is an integer, the power converter comprising:
a plurality of switches coupled between an input bus and an output bus, wherein a first switch, a second switch, a third switch and a fourth switch of the plurality of switches are coupled between the input bus and the output bus;
a full bridge coupled between the output bus and a ground, the full bridge comprising a fifth switch and a sixth switch connected in series between the output bus and the ground, and a seventh switch and an eighth switch connected in series between the output bus and the ground; and
a plurality of capacitors coupled between the plurality of switches and the full bridge, wherein:
a first capacitor of the plurality of capacitors is connected between a common node of the first switch and the second switch, and a common node of the fifth switch and the sixth switch through a switch, and wherein a drain of the switch is directly connected to the first capacitor, and a source of the switch is directly connected to the common node of the fifth switch and the sixth switch;
a second capacitor of the plurality of capacitors is connected between a common node of the second switch and the third switch, and a common node of the seventh switch and the eighth switch; and
a third capacitor of the plurality of capacitors is connected between a common node of the third switch and the fourth switch, and the common node of the fifth switch and the sixth switch, and wherein the source of the switch is directly connected to the third capacitor and wherein the switch is configured such that the power converter is configured to operate in different modes including a 1:1 power conversion operating mode, a 2:1 power conversion operating mode, a 3:1 power conversion operating mode and a 4:1 power conversion operating mode.

14. The controller of claim 13, wherein the power converter is a switched capacitor converter.

15. The controller of claim 14, wherein:
the plurality of gate drive signals is configured such that the power converter is configured as a 1:1 power converter, and wherein:
in a charge mode of the 1:1 power converter, the first switch, the second switch, the third switch and the fourth switch are turned on, and the fifth switch, the sixth switch, the seventh switch, the eighth switch and the switch are turned off; and
in a discharge mode of the 1:1 power converter, the first switch, the second switch, the third switch and the fourth switch, the fifth switch, the sixth switch, the seventh switch, the eighth switch and the switch are turned off.

16. The controller of claim 14, wherein:
the plurality of gate drive signals is configured such that the power converter is configured as a 2:1 power converter, and wherein:
in a charge mode of the 2:1 power converter, the first switch, the second switch, the third switch, the fifth switch, the seventh switch and the switch are turned on, and the fourth switch, the sixth switch and the eighth switch are turned off; and
in a discharge mode of the 2:1 power converter, the second switch, the third switch, the fourth switch, the sixth switch, the eighth switch and the switch are turned on, and the first switch, the fifth switch and the seventh switch are turned off.

17. The controller of claim 14, wherein:
the plurality of gate drive signals is configured such that the power converter is configured as a 3:1 power converter, and wherein:
in a charge mode of the 3:1 power converter, the first switch, the second switch, the fourth switch, the sixth switch and the seventh switch are turned on, and the third switch, the fifth switch, the eighth switch and the switch are turned off; and in a discharge mode of the 3:1 power converter, the third switch, the fifth switch and the eighth switch are turned on, and the first switch, the second switch, the fourth switch, the sixth switch, the seventh switch and the switch are turned off.

18. The controller of claim 14, wherein:

the plurality of gate drive signals is configured such that the power converter is configured as a 4:1 power converter, and wherein:

in a charge mode of the 4:1 power converter, the first switch, the third switch, the fifth switch, the eighth switch and the switch are turned on, and the second switch, the fourth switch, the sixth switch and the seventh switch are turned off; and in a discharge mode of the 4:1 power converter, the second switch, the fourth switch, the sixth switch, the seventh switch and the switch are turned on, and the first switch, the third switch, the fifth switch and the eighth switch are turned off.

\* \* \* \* \*